US009623776B2

(12) United States Patent
    Colsky

(10) Patent No.: US 9,623,776 B2
(45) Date of Patent: Apr. 18, 2017

(54) PORTABLE ARMREST ACCESSORY

(71) Applicant: Andrew E. Colsky, Arlington, VA (US)

(72) Inventor: Andrew E. Colsky, Arlington, VA (US)

(*) Notice: Subject to any disclaimer, the term of this patent is extended or adjusted under 35 U.S.C. 154(b) by 150 days.

(21) Appl. No.: 14/801,317

(22) Filed: Jul. 16, 2015

(65) Prior Publication Data

US 2017/0015224 A1    Jan. 19, 2017

(51) Int. Cl.
    *B60N 2/46*     (2006.01)
    *B64D 11/06*    (2006.01)

(52) U.S. Cl.
    CPC ......... *B60N 2/4673* (2013.01); *B60N 2/4633* (2013.01); *B64D 11/0644* (2014.12)

(58) Field of Classification Search
    None
    See application file for complete search history.

(56) References Cited

U.S. PATENT DOCUMENTS

| 3,893,729 | A | 7/1975 | Sherman et al. | |
| 6,050,644 | A * | 4/2000 | Neal | A47C 7/546 297/411.24 |
| 6,311,939 | B1 | 11/2001 | Christensen | |
| 6,511,131 | B1 | 1/2003 | Harnois | |
| 7,959,231 | B2 | 6/2011 | Lee | |
| 8,201,889 | B2 | 6/2012 | Miranda Montalvo | |
| 8,668,257 | B2 * | 3/2014 | Wu | A47C 7/70 248/446 |
| 2003/0164626 | A1 * | 9/2003 | Lardieri | A47C 1/03 297/35 |
| 2004/0002413 | A1 * | 1/2004 | Wimber | A63B 23/03575 482/140 |
| 2005/0194827 | A1 | 9/2005 | Dowty et al. | |
| 2007/0029850 | A1 * | 2/2007 | Weng | A47D 13/083 297/161 |
| 2007/0241235 | A1 | 10/2007 | Atchison | |
| 2009/0315381 | A1 | 12/2009 | Longnecker | |
| 2012/0181837 | A1 | 7/2012 | Meador | |
| 2013/0341979 | A1 | 12/2013 | Girard | |
| 2014/0252821 | A1 | 9/2014 | Friedlander | |

* cited by examiner

Primary Examiner — David E Allred

(74) Attorney, Agent, or Firm — Welsh Flaxman & Gitler LLC

(57) ABSTRACT

A portable armrest accessory includes a base adapted for attachment to an existing armrest. The base includes an upwardly extending member supporting a horizontal armrest. The upwardly extending member is pivotally secured to both the base and the horizontal armrest so as to allow for adjustment of the horizontal supporting surface of the horizontal armrest.

18 Claims, 4 Drawing Sheets

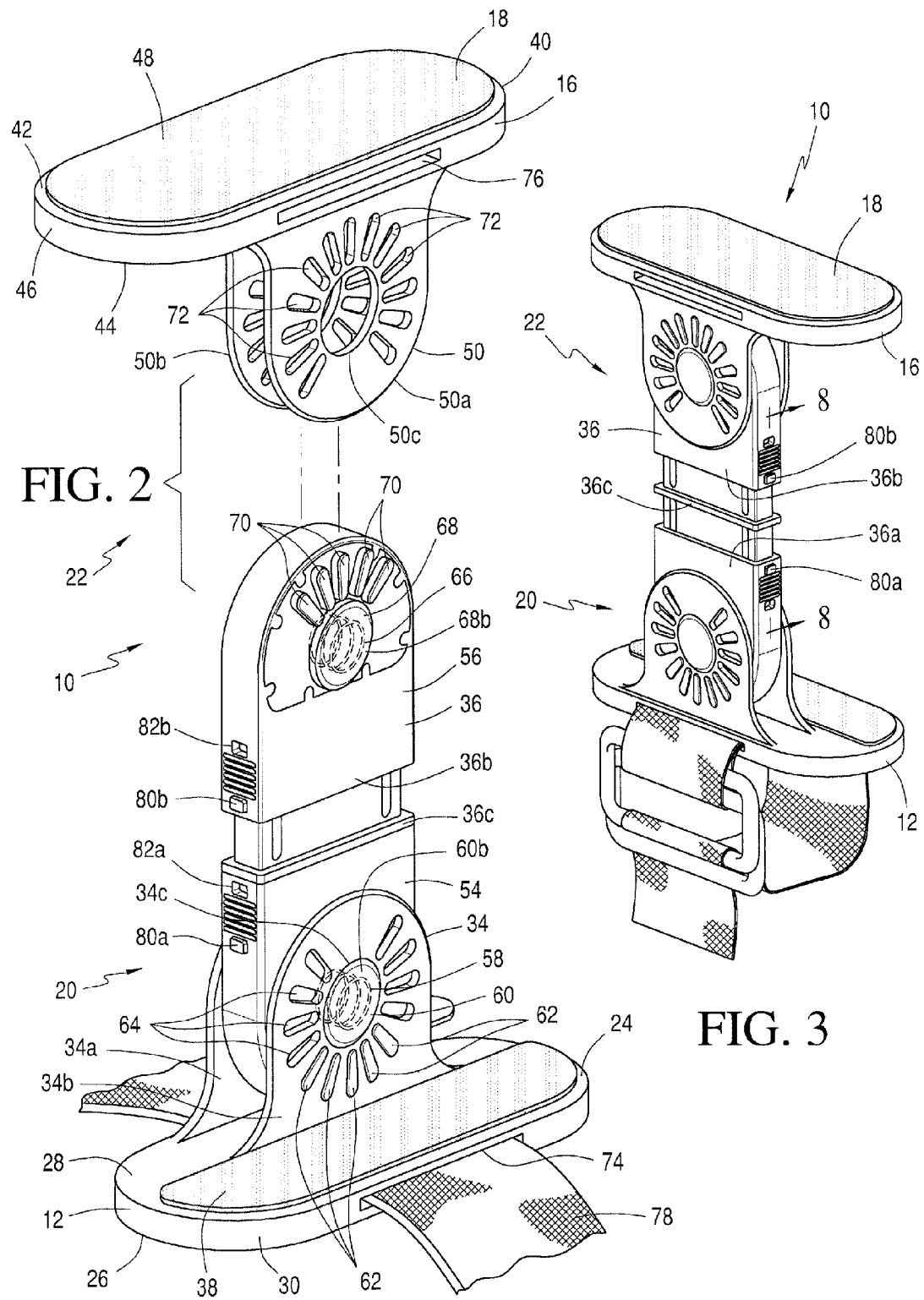

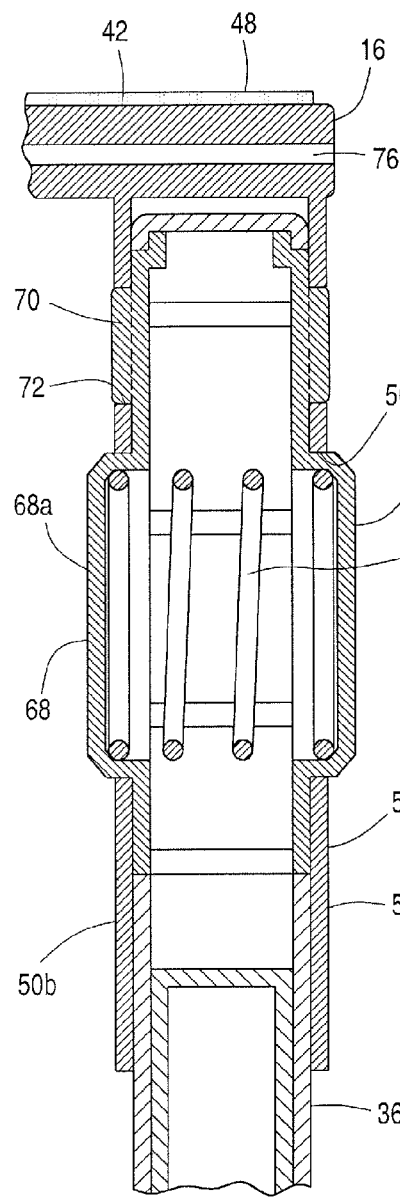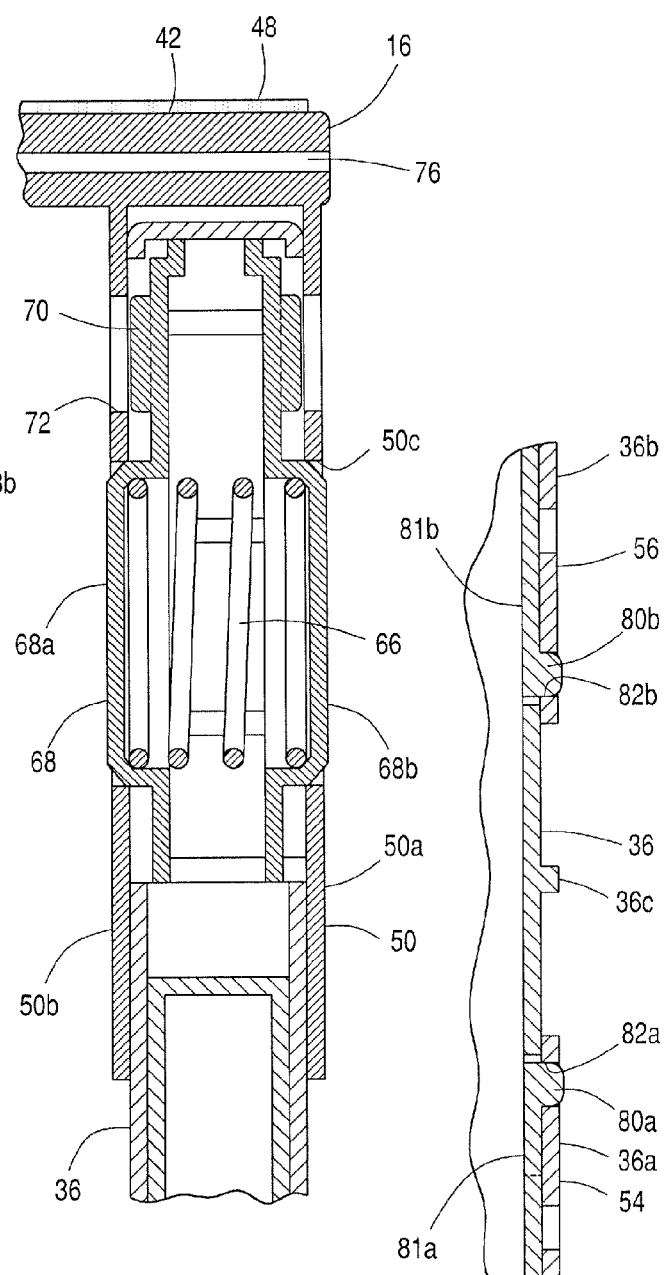
FIG. 6  FIG. 7
FIG. 8

PORTABLE ARMREST ACCESSORY

BACKGROUND OF THE INVENTION

1. Field of the Invention

The present invention relates to a portable armrest accessory.

2. Description of the Related Art

Anyone who has ever sat in the middle seat on a crowded airline flight can appreciate the limited elbow space available when all the seats of a row are taken (or in any other situation where passengers share an armrest). The limited elbow space is further complicated by the fact you likely have never met, and will never meet again, the people sitting next to you. How do you therefore decide who gets access to the limited common space defined by the armrest sitting between you and your companions for the next few hours.

While armrest dividers are known, these prior armrest dividers have not been effective in addressing the problems confronting travelers on a daily basis. As such, a need continues to exist for a device that will accommodate the needs of travelers without inconveniencing either traveler and will enhance the travel experience by expanding the availability of an armrest surface for two people desperately in need of a little more space.

SUMMARY OF THE INVENTION

It is, therefore, an object of the present invention to provide a portable armrest accessory including a base adapted for temporary attachment to an existing armrest. The base includes an upwardly extending member supporting a horizontal armrest, wherein the upwardly extending member is pivotally secured to both the base and the horizontal armrest so as to allow for adjustment of the horizontal supporting surface of the horizontal armrest.

It is also an object of the present invention to provide a portable armrest accessory wherein the base includes a first supporting structure having a flat planar surface with opposed first and second exposed surfaces with a side wall. The first exposed surface includes padding and the second exposed surface includes an upwardly extending hinge structure shaped and dimensioned for pivotal attachment of a connecting member thereto.

It is another object of the present invention to provide a portable armrest accessory wherein the first supporting structure includes a slot extending therethrough for accommodating a strap.

It is a further object of the present invention to provide a portable armrest accessory wherein the upwardly extending member includes a connecting member extending between the first supporting structure and the second supporting structure in such a way that the connecting member may be pivoted relative to both the first supporting structure and the second supporting structure.

It is also an object of the present invention to provide a portable armrest accessory wherein the hinge structure of the first supporting structure only assumes a portion of the second exposed surface and a remaining portion of the second exposed surface is covered with a padding member, and the hinge structure of the second supporting structure only assumes a portion of the second exposed surface and a remaining portion of the second exposed surface is covered with a padding member.

It is another object of the present invention to provide a portable armrest accessory wherein the connecting member includes a first end provided with a spring biased central pivot pin shaped and dimensioned for positioning within the hinge structure of the first supporting structure and the connecting member includes a second end provided with a spring biased central pivot pin shaped and dimensioned for positioning within the hinge structure of the second supporting structure.

It is a further object of the present invention to provide a portable armrest accessory wherein the first end of the connecting member includes a plurality of circumferentially positioned detents shaped and dimensioned for selective engagement with similarly shaped recesses formed in the hinge structure of the first supporting structure and the second end of the connecting member includes a plurality of circumferentially positioned detents shaped and dimensioned for selective engagement with similarly shaped recesses formed in the hinge structure of the second supporting structure.

It is also an object of the present invention to provide a portable armrest accessory including a first supporting structure having a flat planar member with opposed first and second exposed surfaces with a side wall. The first exposed surface includes a padding member and the second exposed surface includes an upwardly extending hinge structure shaped and dimensioned for pivotal attachment of a connecting member thereto. The portable armrest accessory also includes a second supporting structure including a flat planar member having opposed first and second exposed surfaces with a side wall. The first exposed surface includes a padding member and the second exposed surface includes an upwardly extending hinge structure shaped and dimensioned for pivotal attachment of the connecting member thereto. The connecting member extends between the first supporting structure and the second supporting structure in such a way that the connecting member may be pivoted relative to both the first supporting structure and the second supporting structure.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is an exploded perspective view of the portable armrest accessory with the second supporting structure removed from the second end of the connecting member.

FIG. 3 is a perspective view of the portable armrest accessory with the connecting member in an extended orientation.

FIGS. 6 and 7 are cross sectional views showing the compression of the central pivot pin allowing for adjustment of the connecting member relative to the second supporting structure.

FIG. 8 is a detailed cross sectional view showing the adjustment mechanism for the connecting member.

DESCRIPTION OF THE PREFERRED EMBODIMENTS

Figure 1:
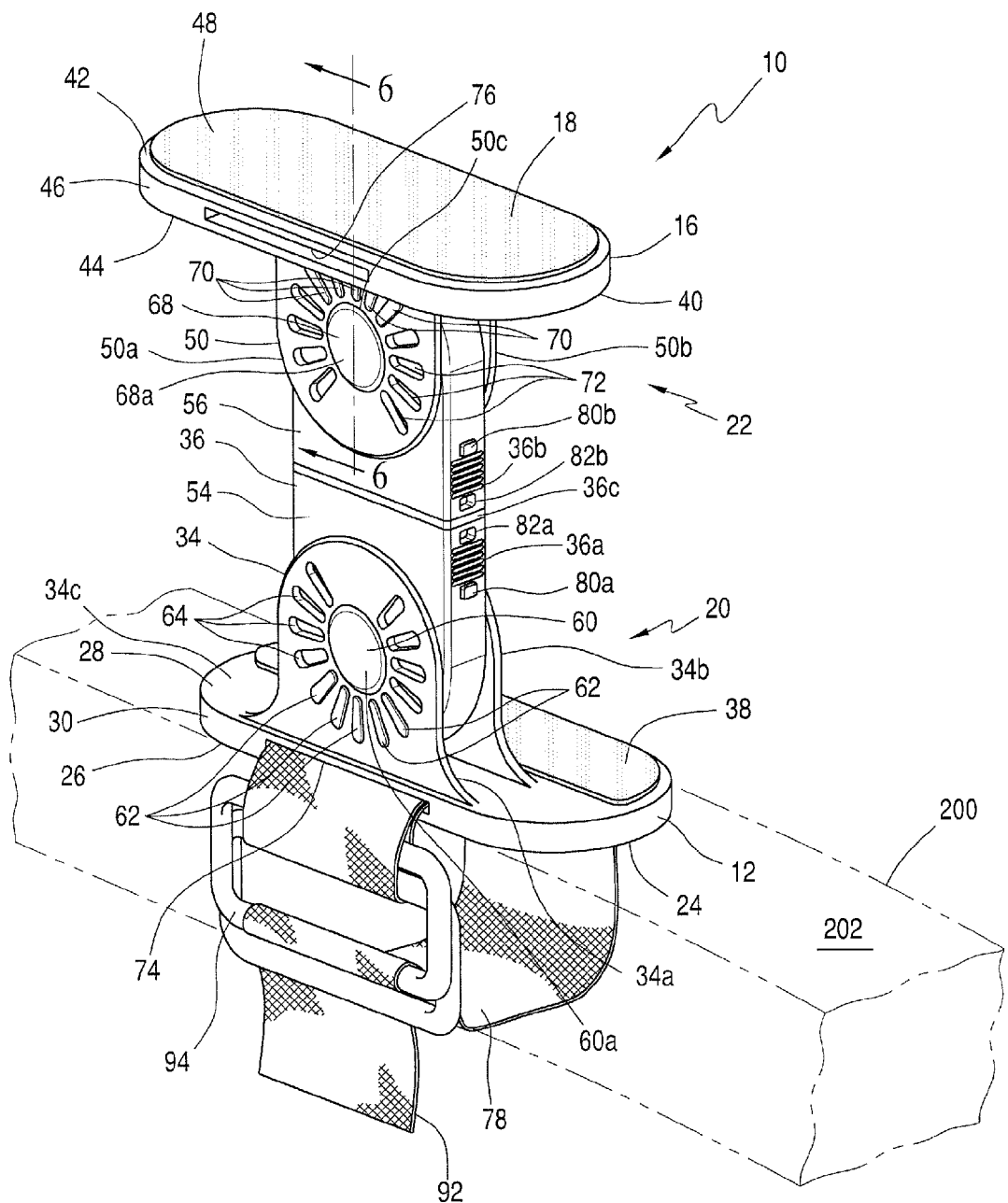
FIG. 1 is a perspective view of the portable armrest accessory with the connecting member extended at a 90 degree angle relative to the first and second supporting structures.
Figure 4:
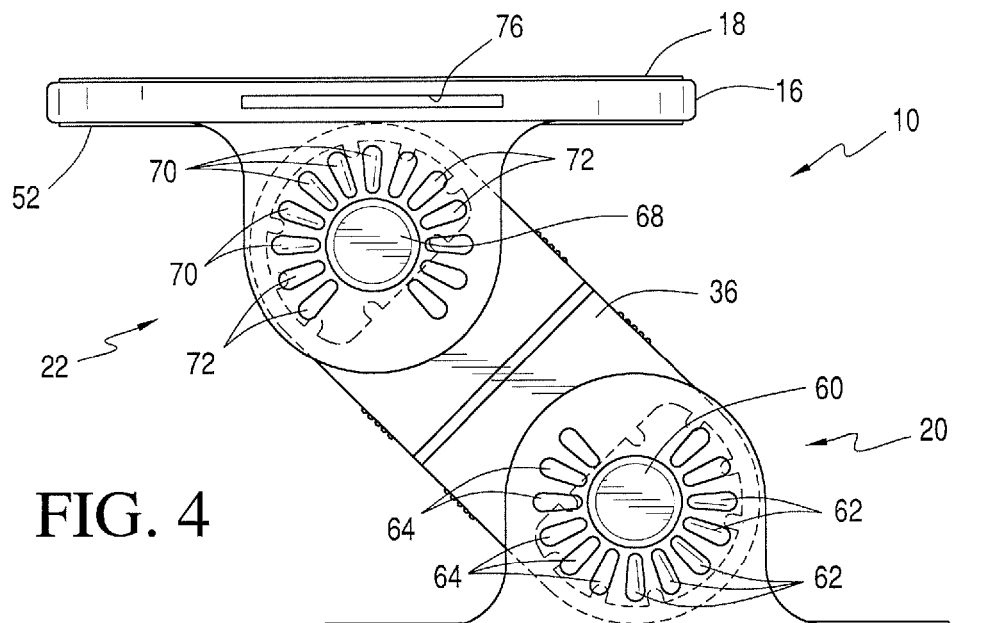
FIG. 4 is a side view of the portable armrest accessory with the connecting member in a retracted orientation and at an oblique angle relative to the first and second supporting structures.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 8, a portable armrest accessory 10 for utilization within an aircraft or other crowded seating environment (for example, theaters, stadiums, etc.) is disclosed. The armrest accessory provides a physical and mental barrier for those people sharing adjacent seats. Briefly, the portable armrest accessory 10 includes a base 12 composed of either a first supporting structure 20 or a second supporting structure 22 (as explained below the disclosed embodiment employs the first support structure 20 as the base 12). The base 12 is adapted for attachment to an existing armrest 200. A connecting member 36 extends from the base 12 to support a horizontal armrest 16 composed of the other of the first supporting structure 20 or a second supporting structure 22 (as explained below the disclosed embodiment employs the second support structure 22 as the horizontal armrest 16). The connecting member 36 is pivotally secured to both the base 12 and the horizontal armrest 16 so as to allow for adjustment of the horizontal supporting surface 18 of the horizontal armrest 16.

As will be appreciated based upon the following disclosure the portable armrest accessory 10 provides multiple surfaces upon which people sharing an armrest may place their arm. The portable armrest accessory 10 also provides a barrier allowing people to avoid the uncomfortable moment when people bump forearms and neither knows exactly the etiquette of who should be moving their forearm away. Still further, the adjustable features of the present invention allow for specific positioning of a support surface to thereby enhance the ergonomics of the seating environment by creating a support surface positioned at an ideal location for a person using the present portable armrest accessory 10. Considering the improvements in ergonomics offered by the present portable armrest accessory 10, it is appreciated the portable armrest accessory 10 may be used by those with injuries, disabilities, or other medical conditions, as well as to prevent injury. It may also be used to help computer users and those who are trying to read.

Considering now the preferred embodiment as disclosed with reference to FIGS. 1 to 8, the portable armrest accessory 10 is designed in a highly symmetrical manner. As such, the base structure may be utilized as the horizontal armrest structure and vice versa. With this in mind, the portable armrest accessory 10 includes identical first and second supporting structures 20, 22. Considering the disclosed embodiment, the first supporting structure 20 functions as the base 12 and the second supporting structure 22 functions as the horizontal armrest 16 although, and as discussed above, the first and second supporting structures 20, 22 are interchangeable.

The first supporting structure 20 includes a flat planar member 24 having opposed first and second exposed surfaces 26, 28 with a side wall 30 extending therebetween. The first exposed surface 26 includes foam padding member 32. While foam is disclosed in accordance with a preferred embodiment it is appreciated other padding materials may be used in accordance with the present invention. The second exposed surface 28 includes an upwardly extending hinge structure 34, composed of parallel upwardly extending hinge walls 34a, 34b, shaped and dimensioned for attachment of the connecting member 36 thereto. The hinge structure 34 only assumes a portion (for example, half (or less)) in accordance with a preferred embodiment) of the second exposed surface 28 and the remaining portion of the second exposed surface 28 is covered with a foam padding member 38. That is, the second exposed surface 28 may be thought of as being divided along its longitudinal axis with the foam padding member 38 on one side and the hinge structure 34 extending from the other side.

Similarly, the second supporting structure 22 includes a flat planar member 40 having opposed first and second exposed surfaces 42, 44 with a side wall 46 extending therebetween. The first exposed surface 42 includes foam padding member 48. The second exposed surface 44 includes a downwardly extending hinge structure 50, composed of parallel downwardly extending hinge walls 50a, 50b shaped and dimensioned for attachment of the connecting member 36 thereto. The hinge structure 50 only assumes a portion (for example, half (or less)) in accordance with a preferred embodiment) of the second exposed surface 44 and the remaining portion of the second exposed surface 44 is covered with a foam padding member 52.

As briefly mentioned above, a connecting member 36 extends between the first supporting structure 20 and the second supporting structure 22 in such a way that the connecting member 36 may be pivoted relative to both the first supporting structure 20 and the second supporting structure 22. The connecting member 36 includes a first end 54 and a second end 56. The first end 54 is provided with a spring biased central pivot pin 60 under the control of a spring 58. The central pivot pin 60 is composed of opposed wall members 60a, 60b with the spring 58 positioned therebetween (see FIGS. 6 and 7 which show the central pivot pin 68 that is identical to the central pivot pin 60). The external surfaces of the central pivot pin 60 are shaped and dimensioned for positioning within a central aperture 34c of the hinge structure 34 of the first supporting structure 20, that is between hinge walls 34a, 34b of the hinge structure 34. Controlled rotation of the first supporting structure 20 relative to the first end 54 of the connecting member 36 is achieved by the provision of a plurality of circumferentially positioned detents 62 extending from the first end 54 of the connecting member 36 for selective engagement with similarly shaped recesses 64 formed in the hinge walls 34a, 34b of the hinge structure 34 of the first supporting structure 20. It should be appreciated that the pivot pin 60 and detents 62 extend from both sides of the first end 54 of the connecting member 36.

Similarly, the second end 56 of the connecting member 36 is provided with a spring biased central pivot pin 68 under the control of a spring 66. The central pivot pin 68 is composed of opposed wall members 68a, 68b with the spring 66 positioned therebetween (see FIGS. 7 and 8). The external surfaces of the central pivot pin 68 are shaped and dimensioned for positioning within a central aperture 50c of the hinge structure 50 of the second supporting structure 22, that is between hinge walls 50a, 50b of the hinge structure 50. Controlled rotation of the second supporting structure 22 relative to the second end 56 of the connecting member 36 is achieved by the provision of a plurality of circumferentially positioned detents 70 extending from the second end 56 of the connecting member 36 for selective engagement with similarly shaped recesses 72 formed in the hinge walls 50a, 50b of the hinge structure 50 of the second supporting structure 22. As with the first end 56, it should be appreciated that the pivot pin 68 and detents 70 extend from both sides of the second end 56 of the connecting member 36.

The spring biased central pivot pins 60, 68 of the first end 54 and the second end 56 of the connecting member 36 are linked to the circumferentially positioned detents 62, 70 such that by pressing the pivot pins 60, 68 the detents 62, 70 are caused to move inwardly such that they move out of the recesses 64, 72 formed in the hinge structures 34, 50 of the first and second supporting structure 20, 22. With the detents moved inwardly, the first supporting structure 20 and/or second supporting structure 22 may move relative to the connecting member 36. Release of the spring biased central pivot pins 60, 68 allows the detents 62, 70 to move outwardly and seat within the recesses 64, 72 formed in the hinge structures 34, 50 of the first and second supporting structures 20, 22.

With the hinge structures 34, 50 as described above in mind, it is possible to maneuver the first supporting structure 20 relative to the second supporting structure 22 in a variety of orientations wherein the first supporting structure 20 is fully maneuvered away from the second supporting structure 22 to extend the distance therebetween and a position where the first supporting structure 20 is substantially adjacent to the second supporting structure 22, thereby minimizing the space therebetween. In particular, the connecting member 36 may be pivoted relative to the first supporting structure 20 and the second supporting structure 22 between a use orientation and a storage orientation. In the use orientation, the first supporting structure 20 and the second supporting structure 22 are spaced apart from one another and the long axis of the connecting member 36 is oriented in a nonparallel relationship with the flat planar members 24, 40 of the first and second supporting structures 20, 22. In the storage orientation the first supporting structure 20 and the second supporting structure 22 are adjacent to each other and the long axis of the connecting member 36 is oriented in a parallel relationship with the flat planar surfaces 24, 40 of the first and second supporting structures 20, 22.

The spring biased central pivot pins 60, 68 of the first end 54 and the second end 56 of the connecting member 36 are linked to the hinge structures 34, 50 such that the first and second ends 54, 56 of the connecting member 36 such that the first and second ends 54, 56 may be selectively attached and detached from the hinge structures 34, 50 such that the first and second supporting structures 20, 22 may be fully removed from (and subsequently reattached to) the connecting member 36. The ability to remove the first and second supporting structures 20, 22, when combined with the symmetrical nature of the hinge structures 34, 50, the pivot pins 60, 68 and the detents 62, 70 allows for further adjustment of the portable armrest accessory 10 by removing, rotating or turning around either the first or second supporting structure 20, 22, and reattaching the first or second supporting structure 20, 22 so that a user can adjust the portable armrest accessory 10 to be closer to the user or further from the user depending on the orientation of how it is flipped (see FIGS. 1 and 2).

In order to allow for attachment of the first supporting structure 20 to the existing armrest, the first supporting structure 20, as well as the second supporting structure 22, is provided with a slot 74, 76 extending laterally therethrough. The slot 74, 76 is shaped and dimensioned for accommodating a strap 78 that extends through the supporting structure 20, 22. The ends of the strap 78 include mating fastening members 92, 94 (for example, a nylon strap end 92 and a double D-ring end 94) to allow for wrapping of the strap 78 about the existing armrest 200 so as to secure the base 12 to the existing armrest 200 for use in accordance with the present invention. Although a nylon strap with a double D-ring is disclosed in accordance with a preferred embodiment, it is appreciated other adjustable coupling structures may be employed. For example, a Velcro hook and loop material may be used for adjustable connection of the strap to an armrest.

Further versatility is provided by allowing for extension of the connecting member 36. In particular, the first and second ends 54, 56 of the connecting member 36 include telescoping elements 36a, 36b that may be selectively extended or retracted from a central supporting structure 36c to ultimately allow for extension or retraction of the distance between the first and second supporting structures 20, 22. This selective retraction or extension is controlled by spring biased detents 80a, 80b extending from resilient lever arms 81a, 81b of the central supporting structure 36c for engagement with recesses 82a, 82b formed in the telescoping elements 36a, 36b.

In practice, once the users decide to secure the portable armrest accessory 10 to an existing armrest 200 between them, the strap 78 is wrapped about the armrest 200 with the first exposed surface 26 of the first supporting structure 20 facing the upper surface 202 of the armrest 200 and the first exposed surface 42 of the second supporting structure 22 facing away from the upper surface 202 of the armrest 200.

With the portable armrest accessory 10 secured to armrest 200, adjustments in the orientation and height of the first exposed surface 42 of the second support surface may be made by taking advantage of the pivotal connections between connecting member 36 and the respective first and second supporting structures 20, 22. Such adjustment is facilitated by pushing in the spring biased central pivot pin 60 of the first end 54 of the connecting member 36. The central pivot pin is connected to the circumferentially positioned detents 62 and pressing the pivot pin 60 in causes the detents 62 to move out of the recesses 64 formed in the hinge structure 34 of the first supporting structure 20 in a manner allowing for rotation of the first supporting structure 20 relative to the connecting member 36. When a desired position is achieved, the pushing in the spring biased central pivot pin 60 of the first end 54 of the connecting member 36 is released and the circumferentially positioned detents 62 are permitted to seat within the recesses 64 formed in the hinge structure 34 of the first supporting structure 20. Rotation of the second supporting structure 22 relative to the connecting member 36 is achieved in the same manner.

Further, the distance between the first supporting structure 20 and the second supporting structure 22 is permitted by pressing in the detents 80a, 80b of the central supporting structure 36c to allow for the relative movement of the telescoping elements 36a, 36b. Once a desired height is achieved, the detent 80a, 80b may be released to seat in the recesses 82a, 82b.

Figure 5:
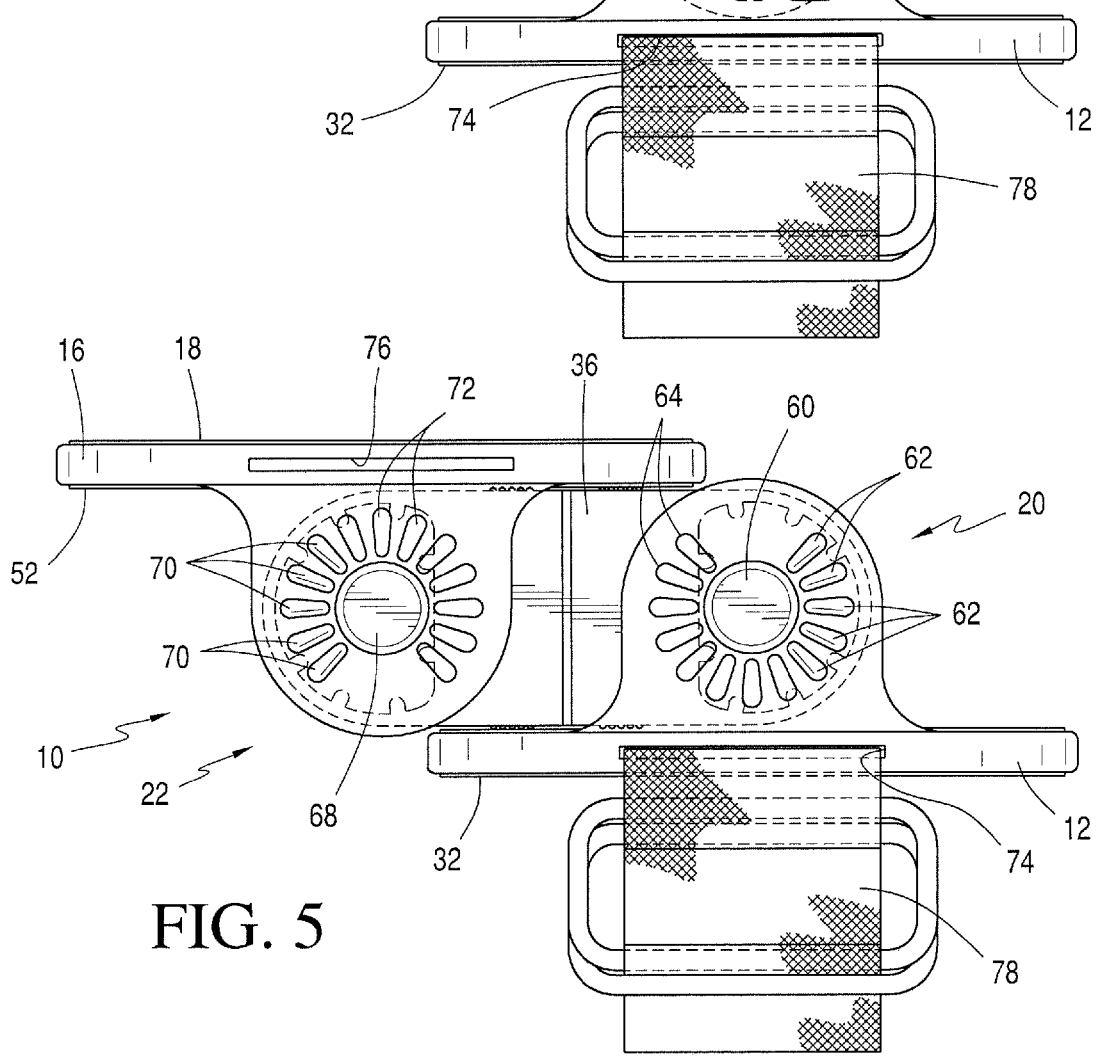
FIG. 5 is a side view of the portable armrest accessory in its storage orientation.

With the portable armrest accessory 10 properly positioned between the users, one user may take advantage of the foam padding member 48 on the first exposed surface 42 as a rest for his or her arm, while the other users may take advantage of the foam padding member 38 on the remaining portion of the second exposed surface 28. Once the portable armrest accessory 10 is no longer needed, the rotation and height adjust mechanisms of the present portable armrest accessory 10 may be used to allow for orientation of the portable armrest accessory 10 in a storage configuration as shown in FIG. 5.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A portable armrest accessory, comprising:
a base adapted for attachment to an existing armrest, the base includes an upwardly extending member supporting a horizontal armrest, wherein the upwardly extending member is pivotally secured to both the base and the horizontal armrest so as to allow for adjustment of the horizontal armrest;
wherein the base includes a first supporting structure having a flat planar member with opposed first and second exposed surfaces of the base with a side wall therebetween, the first exposed surface of the base includes a padding member and the second exposed surface of the base includes an upwardly extending hinge structure shaped and dimensioned for pivotal attachment of a connecting member thereto;
wherein the horizontal armrest includes a second supporting structure having a flat planar member having opposed first and second exposed surfaces of the horizontal armrest with a side wall therebetween, the first exposed surface of the horizontal armrest includes a padding member and the second exposed surface of the horizontal armrest includes a downwardly extending hinge structure shaped and dimensioned for pivotal attachment of the connecting member thereto; and
wherein each of the first and second armrest padding members are adapted for engagement by a user's arm such that the portable armrest accessory is reversible in a top to bottom change of position.

2. The portable armrest accessory according to claim 1, wherein the first supporting structure includes a slot extending therethrough for accommodating a strap.

3. The portable armrest accessory according to claim 1, wherein the upwardly extending member includes the connecting member extending between the first supporting structure and the second supporting structure in such a way that the connecting member is pivoted attached to both the first supporting structure and the second supporting structure.

4. The portable armrest accessory according to claim 1, wherein the hinge structure of the first supporting structure occupies a portion of the second exposed surface and a remaining portion of the second exposed surface of the second supporting structure is covered with a padding member, and the hinge structure of the second supporting structure occupies a portion of the second exposed surface and a remaining portion of the second exposed surface of the second supporting structure is covered with a padding member.

5. The portable armrest accessory according to claim 4, wherein the connecting member includes a first end provided with a spring biased central pivot pin shaped and dimensioned for positioning within the hinge structure of the first supporting structure and the connecting member includes a second end provided with a spring biased central pivot pin shaped and dimensioned for positioning within the hinge structure of the second supporting structure.

6. The portable armrest accessory according to claim 5, wherein the first end of the connecting member includes a plurality of circumferentially positioned detents shaped and dimensioned for selective engagement with similarly shaped recesses formed in the hinge structure of the first supporting structure and the second end of the connecting member includes a plurality of circumferentially positioned detents shaped and dimensioned for selective engagement with similarly shaped recesses formed in the hinge structure of the second supporting structure.

7. A portable armrest accessory, comprising:
a first supporting structure including a flat planar member having opposed first and second exposed surfaces with a side wall extending therebetween, the first exposed surface of the first supporting structure includes a first armrest padding member and the second exposed surface includes an upwardly extending hinge structure pivotally attached to a connecting member;
a second supporting structure including a flat planar member having opposed first and second exposed surfaces with a side wall extending therebetween, the first exposed surface of the second supporting structure includes a second armrest padding member and the second exposed surface includes a downwardly extending hinge structure the connecting member;
the connecting member extends between and is pivotally attached to each of the first supporting structure and the second supporting structure;
wherein each of the first and second armrest padding members are adapted for engagement by a user's arm such that the portable armrest accessory is reversible in a top to bottom change of position.

8. The portable armrest accessory according to claim 7, wherein the hinge structure of the first supporting structure occupies a portion of the second exposed surface and a remaining portion of the second exposed surface is covered with a third armrest padding member, and the hinge structure of the second supporting structure occupies a portion of the second exposed surface and a remaining portion of the second exposed surface is covered with a fourth armrest padding member.

9. The portable armrest accessory according to claim 7, wherein the connecting member includes a first end provided with a spring biased central pivot pin positioned within the hinge structure of the first supporting structure and the connecting member includes a second end provided with a spring biased central pivot pin positioned within the hinge structure of the second supporting structure.

10. The portable armrest accessory according to claim 9, wherein the first end of the connecting member includes a plurality of circumferentially positioned detents shaped and dimensioned for selective engagement with similarly shaped recesses formed in the hinge structure of the first supporting structure and the second end of the connecting member includes a plurality of circumferentially positioned detents shaped and dimensioned for selective engagement with similarly shaped recesses formed in the hinge structure of the second supporting structure.

11. The portable armrest accessory according to claim 10, wherein the spring biased central pivot pin of the first end of the connecting member is linked to the circumferentially positioned detents of the first end of the connecting member such that by pressing the pivot pins the detents are caused to move inwardly such that they move out of the recesses formed in the hinge structures of the first supporting structure, and wherein the spring biased central pivot pin of the second end of the connecting member is linked to the circumferentially positioned detents of the second end of the connecting member such that by pressing the pivot pins the detents are caused to move inwardly such that they move out of the recesses formed in the hinge structures of the second supporting structure.

12. The portable armrest accessory according to claim 7, wherein the first end of the connecting member includes a plurality of circumferentially positioned detents shaped and dimensioned for selective engagement with similarly shaped recesses formed in the hinge structure of the first supporting structure and the second end of the connecting member includes a plurality of circumferentially positioned detents shaped and dimensioned for selective engagement with similarly shaped recesses formed in the hinge structure of the second supporting structure.

13. The portable armrest accessory according to claim 7, wherein the first supporting structure includes a slot extending therethrough for accommodating a strap.

14. The portable armrest accessory according to claim 13, further including a strap having ends including mating fastening members to allow for wrapping of the strap about an armrest so as to secure the first supporting structure to the armrest.

15. The portable armrest accessory according to claim 13, wherein the second supporting structure includes a slot extending therethrough for accommodating a strap.

16. The portable armrest accessory according to claim 7, wherein the connecting member includes a telescoping element that may be selectively extended or retracted for extension or retraction of the distance between the first and second supporting structures.

17. The portable armrest accessory according to claim 7, wherein the connecting member includes a first end selectively locked and unlocked from the hinge structure of the first supporting structure and wherein the connecting member includes a second end selectively locked and unlocked from the hinge structure of the second supporting structure, wherein either the first or second supporting structure may be unlocked and rotated to adjust positioning of the portable armrest accessory.

18. The portable armrest accessory according to claim 7, wherein the connecting member may be pivoted relative to the first supporting structure and the second supporting structure between a user orientation where the first supporting structure and the second supporting structure are spaced from one another and a storage orientation wherein the first supporting structure and the second supporting structure are adjacent one another.

* * * * *